2,701,751
PROCESS FOR PRODUCTION OF ALUMINA

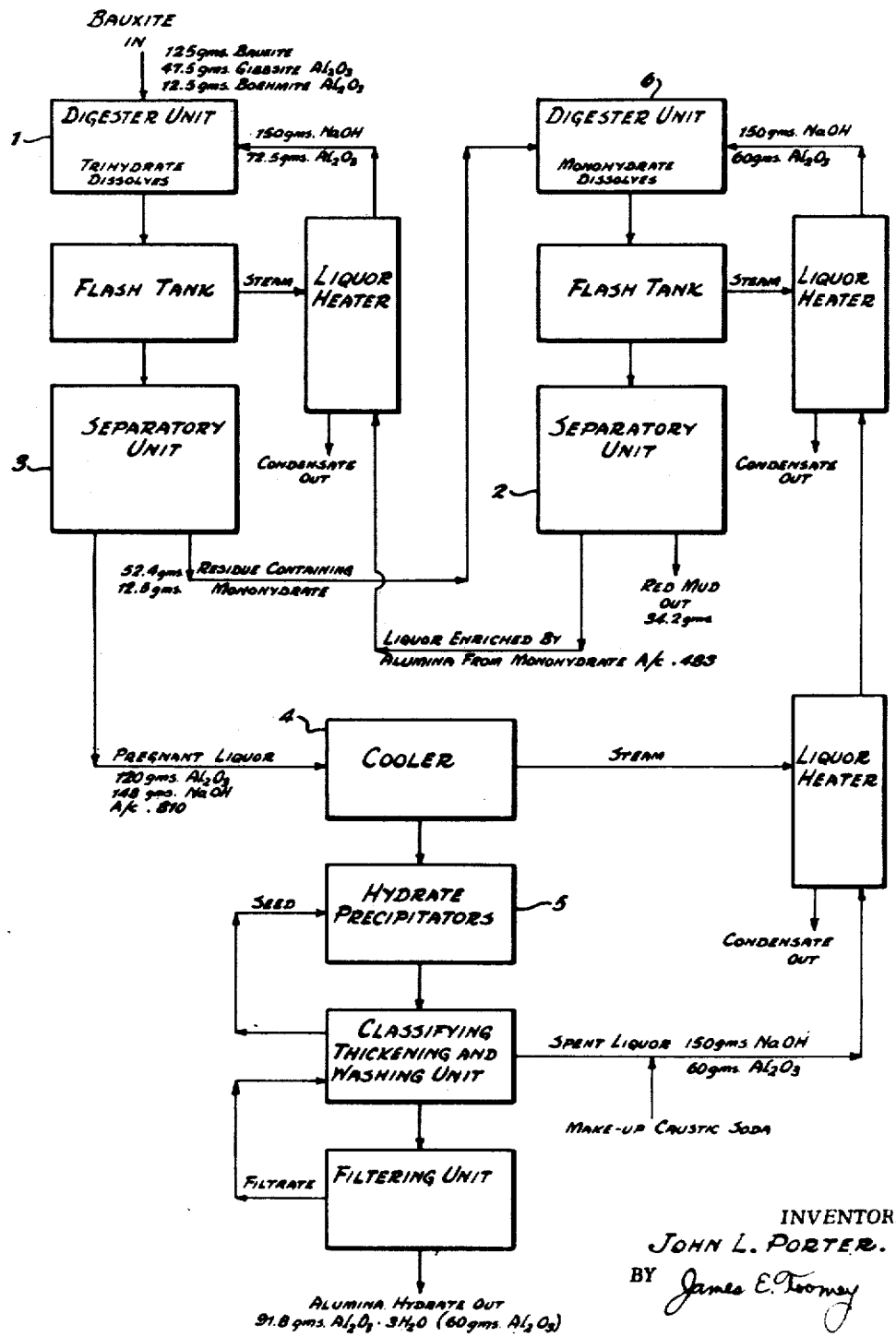

John L. Porter, Baton Rouge, La., assignor to Kaiser Aluminum & Chemical Corporation, a corporation of Delaware Application August 11, 1949, Serial No. 109,640

5 Claims. (Cl. 23—143)

This invention relates to the extraction of alumina from aluminous ores of a particular type. More particularly, the invention relates to an improved process for the recovery of alumina from aluminous ores, such as bauxites or laterites, containing mixtures of alumina monohydrate (boehmite) and alumina trihydrate (gibbsite).

The processing of lower grade aluminous ores from new sources is becoming increasingly important. Such ores are typified by the West Indian bauxites or laterites containing substantial proportions of available alumina in both the trihydrate and monohydrate forms.

Extraction of alumina from ores containing appreciable amounts of both the monohydrate and trihydrate presents a serious problem in regard to recovery of substantially all of the available alumina, while operating under the advantages of the conventional American Bayer method, as opposed to the conventional European practice. This invention provides an improved process whereby substantially all of the available alumina in such a mixed ore may be recovered while operating under conditions which conform substantially to the advantageous conventional American Bayer methods.

The conventional American operation of the well known Bayer process, that is, the wet caustic aluminate method of treating bauxite, was developed for the extraction of high grade bauxites containing substantially all of the available alumina in the form of the trihydrate (gibbsite). When this standard process is applied to ores containing significant quantities of monohydrate (boehmite), only a very small fraction of the monohydrate is extracted. The monohydrate resists dissolution in the presence of the trihydrate at the normal digestion temperatures of from about 290 to 300° F. in the usual spent liquor digestion medium having a caustic concentration not exceeding about 150 grams per liter NaOH and an initial alumina-to-caustic weight ratio of about .400. Consequently it is customary in this country to process only high grade bauxites whose alumina content is substantially all gibbsite.

In the conventional European Bayer process, the ores extracted are generally bauxites of France, Syria and Greece which contain substantially all of the available alumina in the form of boehmite (alumina monohydrate). Such monohydrate ores are extracted efficiently only by employing temperatures as high as about 390°–400° F. and caustic concentrations of from about 250 to 350 grams per liter NaOH with longer digestion times (e. g., three hours or more compared to one-half hour). In addition, the charging ratio, that is, the calculated weight ratio of dissolved alumina to caustic (NaOH) in the green or pregnant liquor based on the ore feed, must be maintained at a comparatively low value, for example, not greater than about .670 (as compared to ratios over .800 for American Bayer trihydrate extraction). This factor necessitates about a four-fold increase in retention time in the autoprecipitation stage for recovery of alumina in order to obtain the same absolute yield as in the conventional American Bayer process because of the greatly reduced precipitation rate in the green liquor resulting from the lower alumina-to-caustic ratio.

Due to the high caustic concentration in the European practice, the digester effluent must be diluted to properly precipitate the alumina hydrate and to prevent excessive failure of the red-mud filter cloths. Such dilution in turn requires a subsequent evaporation operation on the spent liquor to reconcentrate the same for further ore digestion. Thus, the required evaporative capacity greatly exceeds that of the typical American Bayer process plant.

The higher temperatures employed in the European method demand correspondingly higher steam pressures of about 220 to 250 p. s. i. a. Such temperatures cannot be tolerated in the conventional American Bayer digesters designed to operate at pressures corresponding to temperatures not substantially in excess of 300° F.

It is to be noted that aluminous ores composed of any mixture of gibbsite and boehmite may be extracted under the European conditions. However, this would entail operating under these disadvantageous conditions, above-described, which ordinarily would not be necessitated in regard to the trihydrate content of the ore. In addition, fundamental modifications of plant design would be required to adapt a standard American Bayer plant to the European practice. Furthermore, the yield of alumina hydrate per cycle per unit would be greatly reduced due to the inability to operate at a relatively high charging ratio as in the standard American process. Thus, the application of the limiting European conditions to aluminous ores having a substantial trihydrate content is not feasible or desirable.

Accordingly, it is a primary object and purpose of this invention to provide a process whereby cheaper, more readily available bauxite or laterite ores containing mixtures of alumina monohydrate (boehmite) and alumina trihydrate (gibbsite) may be treated to extract substantially all of the available alumina under conditions substantially conforming to the conventional American Bayer process.

It is a further object to provide a process for the extraction of both alumina monohydrate (boehmite) and alumina trihydrate (gibbsite) from aluminous ores in a two-stage digestion employing temperatures and caustic concentrations for both trihydrate and monohydrate digestion conforming to or substantially approaching American Bayer process conditions while operating at a high alumina-to-caustic charging ratio for trihydrate extraction and recovering the available alumina from both the trihydrate and monohydrate simultaneously in good yield.

Another object of the invention is to provide a process for the extraction of alumina from ores containing mixtures of the trihydrate and monohydrate in which the standard American Bayer plant may be utilized substantially without modification in the form of capital expenses, such as installation of high pressure digesters and increased evaporative capacity, which would be necessitated by conversion to European practice.

It has been discovered according to the invention that the ability of a caustic aluminate digestion liquor to dissolve alumina monohydrate is a function of the dissolved alumina-to-caustic weight ratio in the liquor as well as the caustic concentration and temperature. With mixed trihydrate-monohydrate ores, the former is readily extracted in a short time leaving the monohydrate exposed and more susceptible to attack by the caustic digestion liquor. However, the ordinary spent liquor will dissolve little or no monohydrate in the presence of the trihydrate. The dissolution of the trihydrate increases the alumina-to-caustic ratio in the digestion liquor from the normal spent liquor ratio of .400 to a value above that at which solution of the monohydrate is possible. In this way the more readily soluble trihydrate inhibits the extraction of the less soluble monohydrate so the potentially available boehmite is largely lost with the insoluble red mud.

The process of the invention essentially comprises digestion of the boehmite-containing bauxite or laterite ore in a two-stage system with caustic aluminate liquor, in which the boehmite is extracted from residue remaining after extraction of the trihydrate alumina. According to the invention, the alumina trihydrate of the ore is extracted in a first stage digestion with liquor of intermediate alumina-to-caustic ratio at normal American Bayer process caustic concentrations and temperatures to a high charging ratio, that is, to produce a green liquor of high alumina-to-caustic ratio, which is subjected to autoprecipitation to recover the alumina. A residue of red mud containing the undissolved monohydrate alumina remains after trihydrate extraction.

This red mud, after separation from the pregnant liquor, is digested with spent liquor of relatively low alumina-to-caustic ratio from the autoprecipitation at temperatures equal to or only slightly in excess of normal trihydrate digestion temperatures to extract the monohydrate alumina. The liquor resulting from the monohydrate extraction is then sent to the trihydrate digestion stage without recovery of the alumina values to furnish the caustic digestion liquor of intermediate alumina-to-caustic ratio. Fresh ore is again treated in this first stage to extract trihydrate, the ore being charged to give the resulting pregnant liquor a high alumina-to-caustic ratio. This green liquor, containing both the previously extracted monohydrate and newly extracted trihydrate alumina, is then sent to autoprecipitation, while the separated red mud is again digested for extraction of the undissolved monohydrate.

The improved process is generally applicable to aluminous ores containing a major portion of the total available alumina as trihydrate with a minor but significant portion in the form of boehmite or monohydrate. The specific relative proportions of the two hydrates are not critical, however, it being desirable only that the boehmite content be sufficient to justify practical use of the process. Amounts of monohydrate as low as a few percent by weight of total available alumina are deemed sufficient.

As stated above, the process includes the treatment of ores having practically any minor portion of monohydrate, that is, ores containing up to about 50% of the total available alumina in the form of boehmite. However, when the percentage of monohydrate exceeds about ⅓ (33⅓%) of the total available alumina, the percentage of the total monohydrate extracted slightly decreases under the prevailing conditions. This decrease from 100% monohydrate extraction varies with the increase in the percentage of monohydrate content above about 33⅓%. Thus, it may be seen that the invention is particularly applicable to those aluminous ores having a monohydrate content not substantially in excess of about ⅓ of the total available alumina. This apparent limitation is due to caustic concentrations and temperatures, and may be at least partially overcome by adjusting the latter. The caustic concentration for the monohydrate extraction is more or less fixed since the red mud residue containing the undissolved monohydrate is digested with spent liquor from the alumina precipitation from the combined trihydrate-monohydrate digest liquors. This caustic concentration is not substantially in excess of about 150 grams NaOH per liter, which corresponds to standard American Bayer conditions. It follows necessarily, therefore, that the charging ratio for a given rate of feed, or alumina-to-caustic ratio in the pregnant liquor subsequent to monohydrate extraction, must be higher for ores having a higher percentage of monohydrate where substantially all of the monohydrate is extracted. In order to attain these higher charging ratios and thus extract all monohydrate, it becomes necessary to increase digestion temperatures slightly above the normal American Bayer conditions of about 150° C. (290–300° F.). Temperatures not substantially exceeding 170° C. (340° F.) or only 20° C. higher than normal will permit the realization of these higher charging ratios up to about .540, and thus insure the extraction of substantially all of the monohydrate of the ore to a value of about 33⅓% of the total available alumina in the ore.

The temperature generally employed in the initial trihydrate extraction stage where the fresh ore is introduced is the conventional range of about 140–150° C. (290–300° F.). A normal caustic concentration of about 120 to 150 grams per liter NaOH (159 to 200 grams per liter of causticized $Na_2CO_3$) is ordinarily the concentration in the pregnant liquor from the monohydrate extraction used as the digestion liquor for the trihydrate extraction stage.

The ratio of alumina to caustic, $Al_2O_3/NaOH$, in this digestion liquor varies from about .420 to about .540 depending primarily on the monohydrate content of the ore.

The time of digestion is not critical and usual periods of from about 20 to 30 minutes are employed at the standard temperatures and caustic concentrations set forth above.

The pregnant liquor containing both extracted monohydrate and trihydrate has approximately the same caustic concentration as the first stage digestion liquor, namely 120–150 grams per liter. The term "caustic concentration" refers to concentration of free NaOH and NaOH combined as sodium aluminate. Only a slight change in caustic concentration occurs due to a desilication reaction in which some soda is lost as a complex sodium aluminum silicate in the red mud.

The alumina concentration in the pregnant liquor is generally from slightly under 100 to about 130 grams per liter giving a high alumina-to-caustic ratio, $Al_2O_3/NaOH$, of about .800 to .850. This liquor contains a slurry of red mud and undissolved monohydrate from the fresh charge of ore. The liquor suspension is clarified in the conventional manner using settlers, countercurrent decantation and subsequent filtration of the overflow or by direct filtration of the suspension. The pregnant or green liquor is cooled, and seeded with trihydrate crystals as in the normal Bayer process whereby about 50% of the dissolved alumina is precipitated as $Al_2O_3—3H_2O$ and recovered by thickening, washing and filtration.

In the second stage of the process, the red mud containing the undissolved monohydrate alumina is slurried in the spent liquor from the precipitators. This spent liquor, to which caustic soda is added, if necessary, to make up for any loss in the cycle, has a caustic concentration not substantially exceeding 150 grams per liter. It may also be as low as about 120 grams per liter. This value is identical with the range given for the first stage trihydrate extraction in the standard American Bayer operation.

The usual alumina-to-caustic ($Al_2O_3/NaOH$) ratio of the spent liquor is about .400 and is sufficiently low to permit efficient extraction of substantially all monohydrate. However, when the ore being treated has a relatively high percentage of available alumina in the form of monohydrate, e. g., over 33⅓%, it is advantageous to lower the A/C ratio of the spent liquor. Ratios as low as .350 may be obtained by using additional seed and increasing retention time in the precipitation stage. The spent liquor having a lower alumina-to-caustic ratio will permit the dissolution of a larger amount of monohydrate before the charging ratio or the alumina-to-caustic ratio in the pregnant liquor exceeds the limit of solubility of the monohydrate. Thus, monohydrate in excess of about ⅓ the total available alumina may be substantially completely extracted. In any event the alumina-to-caustic ratio should not be substantially in excess of about .400.

The slurry is preferably digested at temperatures of from about 150° to 170° C. (300 to 340° F.), that is, slightly higher than the normal Bayer process digestion temperatures of about 290–300° F. used in the first stage trihydrate extraction. Temperatures in excess of about 170° C. (340° F.) are advantageous but are not obtainable in the ordinary American Bayer plant. The temperature is limited by the maximum operating pressure of the standard digester equipment. However, as noted above, temperatures not substantially exceeding 170° C. permit efficient monohydrate extraction without modification of the typical American Bayer plant to include high pressure digesters such as used in European practice.

It is an alternative included within the scope of the invention to employ temperatures within the relatively high European range, that is, from above 170° C. to as high as 200° C. (350 to about 400° F.) particularly on aluminous ores having a high percentage of monohydrate, for example, over ⅓ the total available alumina. Although necessitating high-pressure digesters, these temperatures insure the extraction of substantially all of the monohydrate even on ores having a monohydrate content up to about 50% of the total available alumina with a spent liquor having the normal American Bayer process caustic concentrations and aluminia-to-caustic ratios.

The digestion time may widely vary and is not critical as long as it is extended sufficiently to insure extraction of substantially all of the monohydrate. This will depend on temperatures, and caustic concentrations, fineness of grind on the ore and the nature of the bauxite, but in general a digestion time of about 20 to 30 minutes is sufficient.

In this manner, the boehmite or monohydrate is efficiently extracted, and subsequently is efficiently precipitated from the liquor of high alumina concentration containing the extracted trihydrate.

The invention is described in greater detail with reference to the following example and the flow diagram shown in the drawings, which are illustrative of typical operation and are not intended to constitute a limitation of the invention. In regard to the example, the invention is described as a batchwise process, or on the basis of a unit cycle, it being understood that the process may advantageously be operated continuously.

125 grams of bauxite containing a total of 52% $Al_2O_3$, analyzing 38% gibbsite $Al_2O_3$, 10% boehmite (available alumina monohydrate) $Al_2O_3$, and 4% unavailable diaspore and clay alumina, was slurried with one liter of caustic aluminate liquor from settler 2. The ore contained 47.5 grams $Al_2O_3$ present as trihydrate and 12.5 grams $Al_2O_3$ present as monohydrate. The digest liquor from settler 2 containing 150 grams per liter NaOH and 72.5 grams $Al_2O_3$, obtained by previous digestion of the boehmite-containing red mud in the spent liquor from the precipitator. The spent liquor $Al_2O_3$ content of 60 grams per liter was increased by extraction of the 12.5 grams of monohydrate. The alumina-to-caustic ratio, $Al_2O_3/NaOH$, was accordingly .483, a moderate or intermediate A/C ratio.

The slurry was digested in digester 1 for about 20 minutes at about 150° C. (300° F.) and the digester effluent was sent to settler 3 where the red mud and unextracted boehmite of the fresh ore were separated from the pregnant aluminate liquor. 54.4 grams of solids were present in the mud. The green liquor contained 148 grams of caustic and 120 grams of soluble $Al_2O_3$ giving an $Al_2O_3/NaOH$ ratio of .810. This green liquor was cooled in coolers 4 to about 50° C. (about 120° F.) and seeded with small trihydrate crystals in the precipitators 5. 91.8 grams of $Al_2O_3$—$3H_2O$ equivalent to 60 grams $Al_2O_3$ were recovered.

The 52.4 grams of red-mud solids containing the undissolved boehmite were slurried with the spent liquor from precipitators 5. The caustic concentration of the liquor was adjusted to 150 g./l. by addition of make-up caustic soda, and the liquor contained 60 grams per liter of dissolved $Al_2O_3$. These concentrations gave a low $Al_2O_3/NaOH$ ratio of .400. The slurry was digested in digesters 6 for about 30 minutes at a temperature of 165° C. (about 330° F.) whereby the alumina concentration of the liquor increased from 60 to 72.5 grams/liter indicating that the entire available 12.5 grams of boehmite were dissolved.

The liquor of the effluent from digester 6 was separated from the insoluble residue in settlers 2 and sent to digester 1 for further extraction of fresh bauxite. In addition, to the 72.5 g./l. $Al_2O_3$, the liquor contained caustic in concentration of 150 grams/liter.

Thus, the alumina production was 60 grams per liter of liquor circulated, representing 50% of the total alumina content of the green liquor.

As indicated above, the efficiency of the process of the invention is based on the high solubility of alumina trihydrate in a moderate alumina ratio liquor and the discovery that monohydrate alumina has a high solubility in low-alumina-ratio liquor at standard American Bayer caustic concentration and temperatures. This is amply demonstrated by the following data showing the increase in availability of monohydrate alumina with decreasing charging ratios:

Variable charges of bauxite were digested with 100 ml. portions of plant spent liquor having a caustic concentration of 155 grams per liter NaOH and an alumina concentration of 57.6 grams per liter. The alumina-to-caustic, $Al_2O_3/NaOH$, ratio was .371.

| | Charging Ratio | Gms. Bauxite | Time, Min. | Temp., C. | Green Liquor, A/C Ratio | $Al_2O_3$ Extracted, Percent on Bauxite |
|---|---|---|---|---|---|---|
| 1 | .820 | 18.39 | 20 | 145 | .830 | 37.02 |
| 2 | .750 | 15.58 | 20 | 145 | .764 | 37.27 |
| 3 | .600 | 7.52 | 20 | 160 | .571 | 40.5 |
| 4 | .530 | 5.28 | 20 | 160 | .526 | 44.32 |
| 4 (a) | .530 | 5.28 | 30 | 165 | .533 | 45.93 |
| 4 (b) | .530 | 5.30 | 30 | 170 | .539 | 47.39 |
| 5 | .470 | 3.48 | 20 | 160 | .478 | 47.79 |

The bauxite used was a Jamaica bauxite analyzing 49.6% $Al_2O_3$, and a total theoretical available alumina content of 47.3% of which the trihydrate or gibbsite $Al_2O_3$ was 37% and the balance of 10.3% $Al_2O_3$ was boehmite or alumina monohydrate.

An attempt was made to extract all of the available alumina, that is, both the trihydrate and monohydrate simultaneously. It is clear that at the advantageous high charging ratio of over .800 used in the present process for trihydrate extraction none of the monohydrate was extracted. At a charging ratio of .530 and a digestion temperature of 170° C., all of the monohydrate and trihydrate alumina was extracted.

Thus, the two-stage digestion of the present invention provides a means of extracting substantially all of the monohydrate alumina, while avoiding the very low charging ratios which would be necessitated if the monohydrate were extracted along with the trihydrate. If simultaneous extraction were practiced efficient extraction of both forms of alumina would necessitate the very low charging ratios, not greater than about .540, for trihydrate as well as monohydrate, in which case the yield per cycle would be uneconomical and the volume of circulating liquor would be excessive.

The process further provides for extraction of all of the trihydrate and monohydrate alumina in a much shorter time than that required for monohydrate extraction in accordance with the conventional European practice, while avoiding the disadvantageously high caustic concentrations, high temperatures, and low alumina-to-caustic charging ratios (at least for the trihydrate digestion).

In the foregoing specification, and in the appended claims, the alumina to caustic ratios are weight ratios of dissolved alumina expressed in grams per liter and caustic soda expressed in grams per liter NaOH.

I claim:

1. A continuous process for the production of alumina from aluminous ores containing a major portion of the total available alumina content as trihydrate and a minor portion as monohydrate, which comprises digesting a fresh ore charge at temperatures of from about 140 to 150° C. in recycled pregnant caustic aluminate liquor resulting from the extraction of monohydrate alumina from the residue of a previous ore charge, said liquor having a caustic concentration of from about 120 to 150 grams per liter and an alumina to caustic ratio of from about .420 to .540 thereby extracting substantially all of the trihydrate alumina from the fresh ore charge without extraction of the monohydrate alumina content thereof, separating the residue of the fresh ore charge containing the undissolved monohydrate alumina from the pregnant liquor containing the extracted trihydrate alumina, recovering alumina from the pregnant liquor by autoprecipitation, extracting the monohydrate alumina from the residue of the fresh ore charge by digestion in the spent caustic liquor from autoprecipitation at temperatures of from about 150 to 170° C., said spent liquor having a caustic concentration of about 150 grams per liter and an alumina to caustic ratio of about .400 gram per liter, separating the pregnant monohydrate extraction liquor from the exhausted ore residue, and recycling said monohydrate extraction liquor as digestion liquor for extraction of the trihydrate alumina content from another fresh ore charge.

2. A process for the extraction of alumina from aluminous ore material containing a major portion of the total available alumina as the more caustic soluble trihydrate and a minor portion as the less caustic soluble monohydrate, which comprises digesting said aluminous ore material in recycled caustic aluminate liquor having a caustic soda concentration not substantially exceeding 150 grams per liter NaOH and a temperature not substantially exceeding about 150° C. to substantially completely extract the trihydrate alumina content, the amount of trihydrate alumina dissolved being sufficient to increase the alumina to caustic soda ratio of the liquor to at least 0.800 thereby preventing any substantial extraction of the less soluble monohydrate, separating the monohydrate alumina-containing residue from the alumina-enriched liquor, substantially completely extracting the monohydrate alumina from the residue by digestion in spent caustic aluminate liquor having a caustic concentration not substantially exceeding about 150 grams per liter NaOH and an alumina to caustic soda ratio not substantially exceeding about 0.400 at temperatures of at least about 150° C., and recycling the monohydrate alumina extraction liquor for extraction of the trihydrate alumina content from additional fresh ore material.

3. A process according to claim 2 in which the monohydrate alumina-containing residue is digested at temperatures of from about 150–170° C., and the resulting liquor has an alumina to caustic soda ratio not substantially exceeding about 0.540.

4. A process for the extraction of alumina from aluminous material containing a major portion of the caustic soluble alumina as trihydrate and a minor portion as monohydrate, comprising the steps of digesting said aluminous material in caustic aluminate liquor having a caustic soda concentration not substantially exceeding 150 grams per liter NaOH, an alumina to caustic soda ratio not substantially exceeding about 0.54 and a temperature not substantially exceeding about 150° C. whereby the trihydrate alumina content of the material is substantially completely extracted, while leaving a residue containing substantially all of the monohydrate content of the material, separately digesting the monohydrate alumina-containing residue in caustic aluminate liquor from which alumina has been precipitated, said liquor having a caustic soda concentration not exceeding about 150 grams per liter NaOH, an alumina to caustic soda ratio not substantially exceeding about 0.400 and a temperature of at least 150° C. to substantially completely extract the monohydrate alumina, and recycling the monohydrate alumina extraction liquor to the trihydrate alumina extraction stage.

5. A process according to claim 4 in which the monohydrate alumina containing residue is digested at temperatures of from about 150 to not substantially exceeding about 170° C.

References Cited in the file of this patent

UNITED STATES PATENTS

| 461,416 | Bradburn et al. | Oct. 20, 1891 |
| 1,007,495 | Serpek | Oct. 31, 1911 |
| 2,244,194 | Haglund | June 3, 1941 |

FOREIGN PATENTS

| 637,578 | Great Britain | May 24, 1950 |

UNITED STATES PATENT OFFICE

CERTIFICATE OF CORRECTION

Patent No. 2,701,751                                                        February 8, 1955

John L. Porter

It is hereby certified that error appears in the printed specification of the above numbered patent requiring correction and that the said Letters Patent should read as corrected below.

Column 5, line 19, for "containing" read -- contained --; line 31, for "54.4 grams" read -- 52.4 grams --.

Signed and sealed this 17th day of November 1959.

(SEAL)
Attest:

CARL H. AXLINE
Attesting Officer

ROBERT C. WATSON
Commissioner of Patents